United States Patent

Suggs, Sr.

[11] Patent Number: 5,356,163
[45] Date of Patent: Oct. 18, 1994

[54] TIRE TRUCK

[75] Inventor: Donald R. Suggs, Sr., Boyd, Tex.

[73] Assignee: Tire Shuttle, Inc., Elm Mott, Tex.

[21] Appl. No.: 992,576

[22] Filed: Dec. 18, 1992

[51] Int. Cl.⁵ .......................... B62B 1/10; B60B 29/00
[52] U.S. Cl. ............................ 280/47.27; 280/47.24; 414/426
[58] Field of Search .............. 414/426, 428, 427, 429; 280/47.24, 47.23, 47.27

[56] References Cited

U.S. PATENT DOCUMENTS

| | | | |
|---|---|---|---|
| 1,374,986 | 4/1921 | Carter . | |
| 1,892,979 | 1/1933 | Clark | 414/428 |
| 1,965,260 | 7/1934 | Rosenberg | 414/428 |
| 2,135,802 | 11/1938 | Dinkins | 414/428 |
| 2,207,443 | 7/1940 | Schneider | 414/428 |
| 2,345,458 | 3/1944 | Caron | 414/428 |
| 2,447,435 | 8/1948 | Settle | 414/428 |
| 2,483,908 | 10/1949 | Jackson | 414/428 |
| 2,514,781 | 7/1950 | Miller . | |
| 2,525,437 | 10/1950 | Winzler et al. . | |
| 2,546,509 | 3/1951 | Huff | 414/428 |
| 2,551,483 | 5/1951 | Bartoe | 414/428 |
| 2,600,577 | 6/1952 | Roe | 280/47.24 X |
| 2,619,320 | 11/1952 | Miller . | |
| 2,691,454 | 10/1954 | Demlo . | |
| 2,704,165 | 3/1955 | Hoover . | |
| 2,780,476 | 2/1957 | Upchurch . | |
| 2,808,162 | 10/1957 | Hellyer . | |
| 2,877,912 | 3/1959 | Di Giacomo | 414/428 |
| 3,045,851 | 7/1962 | Rupert . | |
| 3,123,238 | 3/1964 | McKelvey | 414/428 |
| 3,233,764 | 2/1966 | Hirsch . | |
| 3,441,157 | 4/1969 | Kitsuda . | |
| 3,463,337 | 8/1969 | Reznicek | 414/428 |
| 3,499,659 | 3/1970 | Capadalis | 280/47.27 X |
| 3,598,420 | 8/1971 | Edlin | 280/47.24 |
| 3,735,882 | 5/1973 | Reznicek | 414/428 |

FOREIGN PATENT DOCUMENTS 1161566  8/1969  United Kingdom ................ 414/428

OTHER PUBLICATIONS

Myers Tire Supply Catalog No. 325, 1991 (pp. 144 and 158).

Primary Examiner—Margaret A. Focarino
Assistant Examiner—Florian Zeender
Attorney, Agent, or Firm—Guy V. Manning

[57] ABSTRACT

A wheeled tire truck is provided for installing, removing and transporting rim-mounted tires for vehicles. The truck comprises an elongated body section and extended fork section supported by a transverse axle having wheels at either end bracketing the body. The body includes a handle section extending opposite the fork section to terminate in a grip, and the fork section extends opposite the handle for straddling the tire on either side of its center of gravity and beneath its tread. The tire rests against the handle portion and separate tire rests over each wheel, and the tire may be transported by balancing the weight of the tire on the wheels while pushing on the grip.

14 Claims, 4 Drawing Sheets

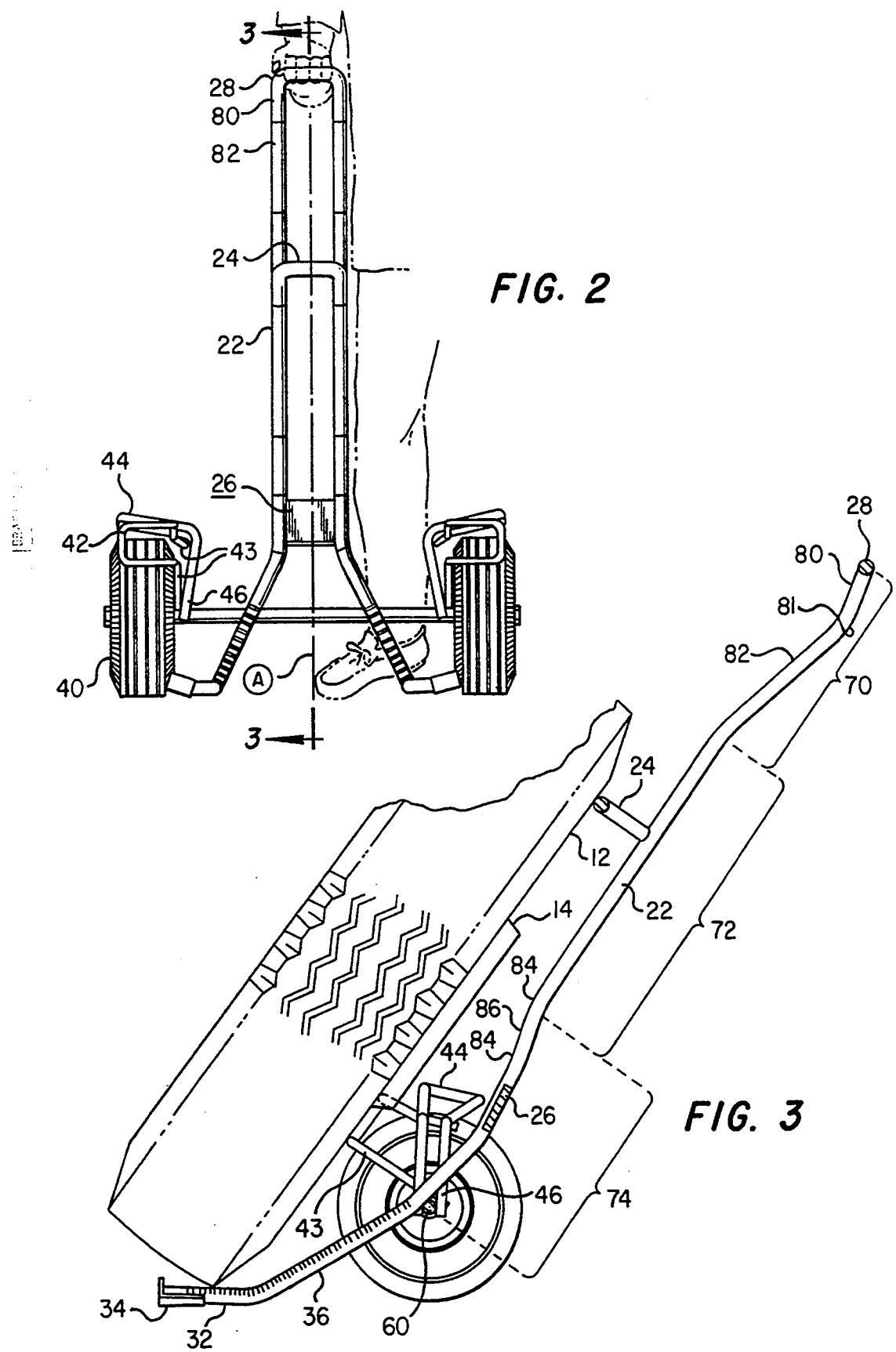

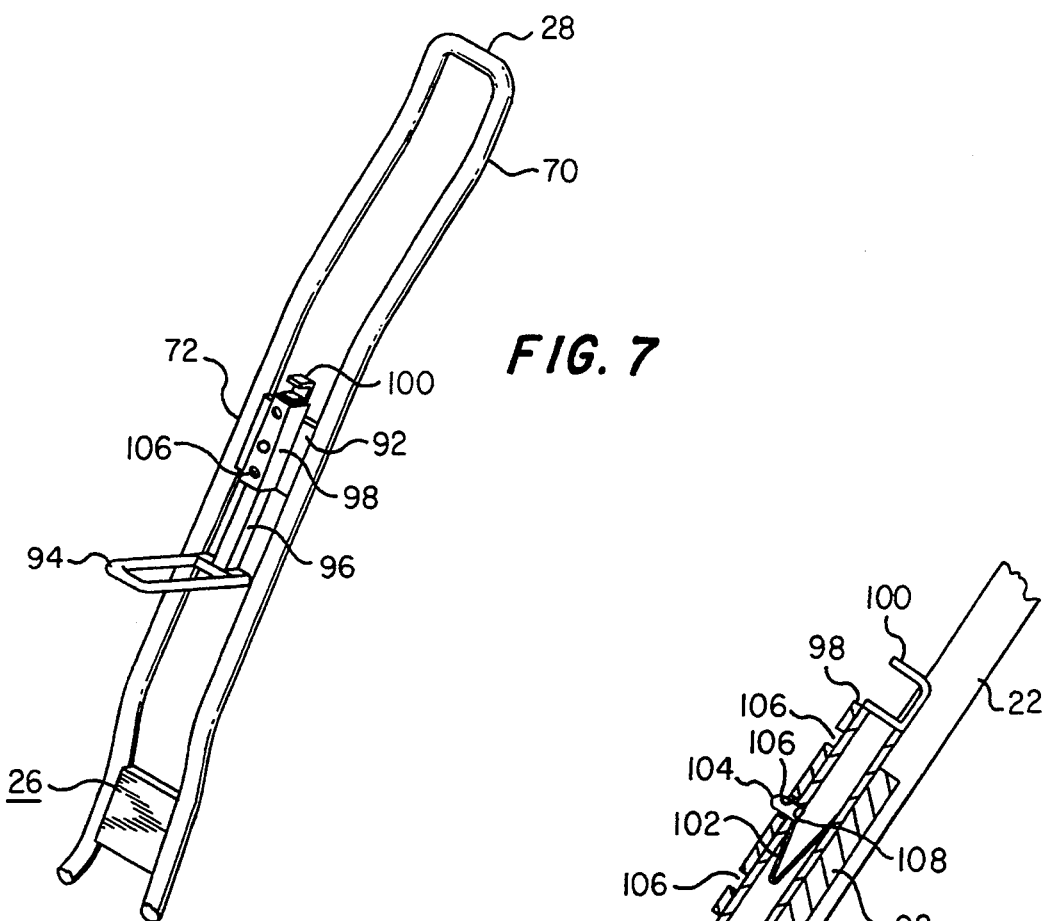
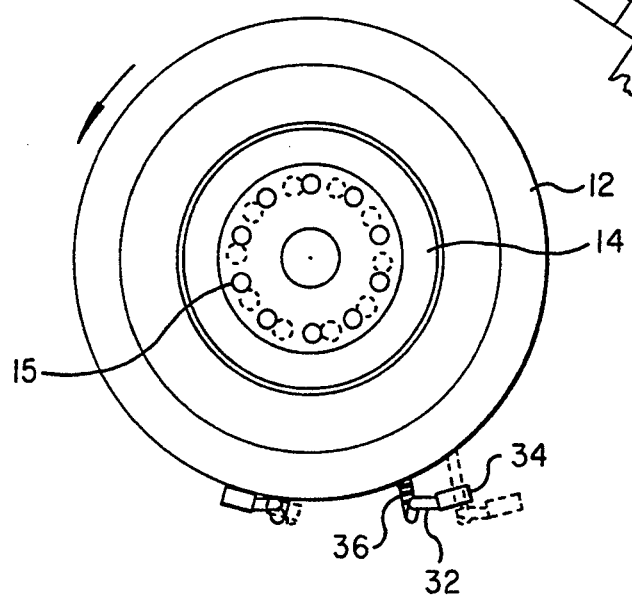

TIRE TRUCK

BACKGROUND OF THE INVENTION

1. Field of the Invention

This invention relates to improvements to wheeled hand trucks and particularly to a wheeled tire truck adapted for handling and transporting rim-mounted tires during installation or removal of tires for vehicles.

2. Description of Related Art

Anyone who has changed a flat tire on an automobile recognizes how awkward it is to install a rim-mounted tire onto the axle hub located beneath the fender of a vehicle. The installer must lift the weight of the rim and tire while simultaneously aligning the lug bolts on the hub with matching holes in the rim. Only then can the tire be engaged with the lugs and nuts installed to secure the rim to the axle. If the installer has no manipulating tools to assist him, he must perform these activities while reaching under the fender and supporting the rim and tire at arms length, promising him at best soiled clothing and threatening injuries.

Rim-mounted tires for large trucks or tractors offer even greater challenges because of their greater weight. Some rim-mounted truck tires weigh in excess of two hundred pounds, making them almost impossible to lift by hand in such awkward circumstances, while tractor tires generally are too heavy to lift by hand at all. Further, tandem or dual wheels on larger trucks require installation and removal of tires recessed much farther beneath the fender than on conventional automobiles. A need exists for a tire manipulating device which facilitates installation and removal of wheel-mounted tires for large trucks.

Truck and tractor tires can be a challenge just to lift off the floor and to stand upright on their treads for relocation. Conventional practice dictates that a lever bar be inserted beneath the sidewall of the tire and lifting pressure applied to the handle end of the lever to lift one side of the tire off the floor. The operator then repeatedly must support the weight of the inclined tire while he resets the lever to lift the tire farther, thereby ratcheting the side of the tire upward until the tire stands upright on its tread. During this activity, the operator must laterally control the weight of the rim and tire to prevent it from rolling off the lever bar. If the operator loses control of a heavy truck or tractor tire during this activity, he must dodge away and let the tire fall back to the floor or risk back or leg strain trying to manhandle the tire without the lever for assistance. A need exists for a safer method and apparatus for lifting heavy, rim-mounted tires.

Once a heavy truck or tractor tire has been lifted into a position resting upon its tread, it can be rolled into place for installation onto a vehicle. At the vehicle fender, however, space for rolling it back and forth while working it toward the axle hub is restricted, requiring a series of very short rolling operations alternately turning the tire to direct its progress in the desired direction. The same activity is required during removal of the tire. As the tire progresses toward the axle hub during installation, the operator must reach farther and farther under the fender to support and manipulate the tire or crawl under the fender with it. The latter option is especially hazardous because the space is constricted, causing the operator to crouch in an awkward position and increasing the risk of injury and of losing control of the tire. A need exists for a device to assist in translating a truck or tractor tire beneath a vehicle fender for installation onto the axle hub and for removal.

SUMMARY OF THE INVENTION

Accordingly, it is an object of this invention to provide a means for facilitating the manipulation of wheel-mounted tires during installation and removal on vehicles.

It is another object of this invention to provide an apparatus adapted to assist lifting heavy tires into a standing position.

It is yet another object of this invention to provide a means for readily translating a heavy truck tire directly toward and away from the axle hub without requiring repetitive back and forth manipulation beneath the fender.

The foregoing and other objects of this invention are achieved by providing a wheeled tire hand truck for installing, removing and transporting rim-mounted tires for vehicles. The truck comprises an elongated body section and extended fork section supported by a transverse axle having wheels at either end bracketing the body. The body includes a handle section extending opposite the fork section to terminate in a grip, and the fork section extends opposite the handle for straddling the tire on either side of its center of gravity and beneath its tread. The tire rests against the handle portion and separate tire rests over each wheel, and the tire may be transported by balancing the weight of the tire on the wheels while pushing on the grip.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

FIG. 2 shows a front elevational view of the tire truck of FIG. 1.

FIG. 3 shows a longitudinal section of the tire truck with a tire resting in position for transportation.

FIG. 6 shows the effect on the tire of the operation depicted in FIG. 5.

FIGS. 7 depicts in perspective an alternate embodiment of a portion of the body of the tire truck having an adjustable tire prop.

FIG. 8 shows a longitudinal section of the prop of FIG. 7 and details the spring pin locking mechanism.

DETAILED DESCRIPTION OF A PREFERRED EMBODIMENT

Figure 1:
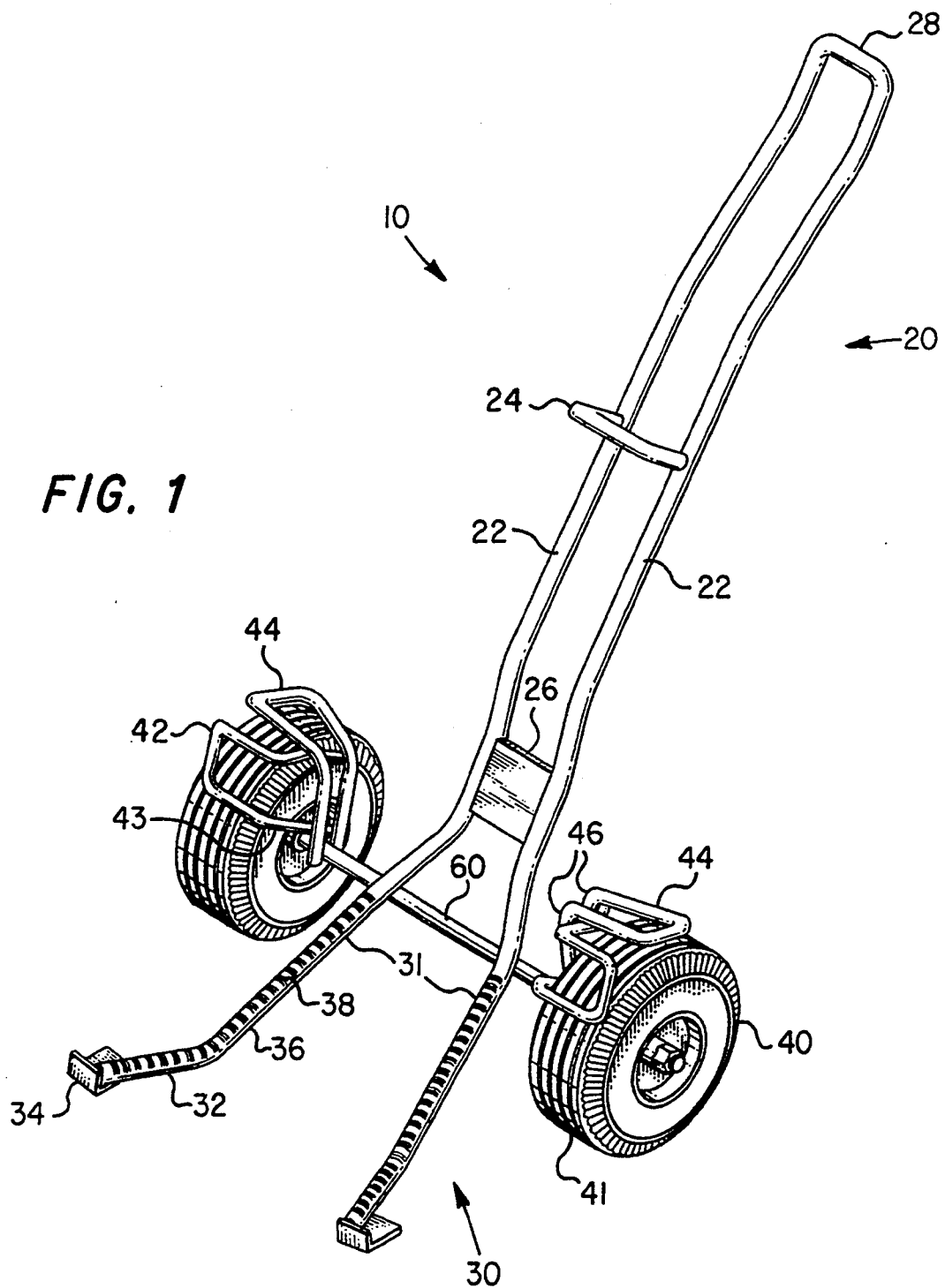
FIG. 1 depicts the tire truck of the present invention in upper right frontal perspective.

With reference now to the figures, and in particular to FIGS. 1, 2 and 3, tire truck 10 of the present invention is designed to support rim-mounted tire 12 for transportation and manipulation. Symmetric about longitudinal axis A, coincident with section lines 3—3 of FIG. 2, truck 10 comprises elongated body 20 extending between plate 26 proximate transverse axle 60 and grip 28 at the distal end of body 20. Fork section 30 extends opposite body 20 from plate 26 and couples to axle 60. Fork section 30 comprises two divergent tines 31, each tine 31 further comprising leg 36 coupled to foot 32 which terminates in pad 34 adapted to rest on the floor or ground when truck 10 is supporting tire 12.

Wheels 40 carried on either end of axle 60 bracket and support truck 10 and serve as a fulcrum. Step 44 spans the tread of wheel 40 to provide an operator a place to brace his foot against truck 10 to assist him with controlling truck 10. Attached to step legs 46 by rest legs 43 is tire rest 42 against which tire 12 leans as shown in FIG. 3. Tire rest 42 and step 44 are shown formed from a single piece of bar stock bent into a planar portion covering part of the tread of wheel 40 and coupled to axle 60 by step legs 46. One having ordinary skill in the art will recognize that such construction may be replaced by other suitable means such as steel plate or the like without departing from the spirit and scope of the invention. For example, step 44 and tire rest 42 could be fabricated as a single fender unit covering part of tire 40 and presenting two planar surfaces serving the functions described above, or they could be independent of each other.

Body 20 further comprises central deck portion 72 flanked by handle portion 70 and basket portion 74. Deck 72, handle 70, basket 74 and fork 30 preferably are formed from a single length of steel bar 22 bent at appropriate places to form the components described symmetric about axis A. One having ordinary skill in the relevant art will recognize that such components could alternately be formed separately and joined as required using suitable means such as welding. Further, they all need not be made of the same material, but may vary according to the stresses experienced by each component. When made from unitary bar stock, bars 22 are preferably three-quarter (¾") inch rod grade B-7 (hot rolled SAE 4142 heat treated and stress relieved, substantially equivalent to bolt specification grade 8) cold bent at selected locations along its length to achieve the geometric arrangement depicted and described. Though highly resistant to bending, this grade of steel is soft enough to bend double rather than snap under excess loads, providing a desirable safety feature. Alternately, forged tool steel rated at similar specifications satisfies these criteria. One having ordinary skill in the art will recognize, however, that the diameter and strength selected depend upon the expected loads. For example, the steel bar required for satisfactory lifting of automobile and light duty truck tires is smaller in diameter than that needed for lifting much heavier truck and tractor tires, and truck 10 can be made of the smaller bar and retain satisfactory resiliency and resistance to bending. Further, one having ordinary skill in the art will recognize that all grades of steel meeting such criteria, as well as others less desirable and even other materials such as rigid aluminum and high strength thermoplastics may serve the purpose under certain loading conditions and are considered within the spirit and scope of the present invention.

As seen in FIG. 3, portions of bar 22 comprising deck 72 form a plane substantially parallel to the plane of tire 12 when it is resting on truck 10. Prop 24 extends perpendicular to deck 72 to engage the top of tire 12, tire rests 42 engage either side of tire 12 proximate axle 60, and feet 32 of fork section 30 engage the tread of tire 12 at two places on its lower perimeter to prevent tire 12 from sliding downward. Grooves 38 cut into transverse bar 22 in fork section 30 provide traction to the tread of tire 12 to prevent slippage.

With tire 12 in the position shown in FIG. 3, its center of gravity remains substantially forward (toward feet 32) of axle 60, rendering stable truck 10 while sitting upright. With its weight so distributed, rim-mounted tire 12 can be towed long distances using truck 10 with relatively little exertion by the operator, unlike with conventional dollies, the load of which must be carefully balanced on the wheels lest the operator bear it himself. In fact, even with truck 10 laid down with handle 70 contacting the floor, deck 72 lies substantially parallel to the floor or tilted slightly toward feet 32. This keeps the load of rim-mounted tire 12 astraddle axle 60, balancing the weight across that fulcrum and requiring relatively little force to lift grip 28. Obviously, with loads having higher centers of gravity (along axis A toward grip 28), the balance point will shift relative to axle 60, but this does not occur with wider loads (transverse to axis A), and truck 10 may be used to transport rather easily planar loads substantially wider than the separation of wheels 40.

FIGS. 7 and 8 depict an alternate embodiment for prop 24. Adjustable prop 94 rides on shank 96 which telescopes into collar 98 supported on prop plate 92 between bar portions 22 of deck 72. Ports 106 arranged parallel to axis A in the top of collar 98 receive pin 104 protruding from inside shank 96 and held in place by spring 102. Pin 104 locks prop 94 into one of a plurality of longitudinal positions along deck 72. Depressing pin 104 until it clears collar 98, but still protrudes through its access hole 108 through shank 96, permits shank 96 to slide longitudinally until pin 104 snaps into place penetrating another port 106. Knob 100 may be provided to facilitate manipulation of the adjustment. Knob 100 may be made small enough to slide through collar 98, permitting removal and insertion of prop 94 from the grip end of collar 98, resulting in twice the number of positions for prop 94 as the number of ports 106 provided in collar 98.

Handle 70 comprises a substantially U-shaped portion of bar 22 having two arms 82 coupled to deck 72 and extending parallel to each other but in a different plane from deck 72. Elbows 81 join arms 82 to divert fingers 80 into yet a different plane, fingers 80 coupling to opposite ends of grip 28. Grip 28 is thereby offset back toward the plane of deck 72. This offset protects from injury the hand of an operator who permits truck 10 to pivot about axle 60, especially under the weight of tire 12, until handle 70 contacts the floor. The offset also provides a means of reaching under grip 28 when elbows 81 rest on the floor. Further, elbows 81 comprise the apex of an angular offset of handle 70 from the plane of deck 72, the offset preferably selected to cause deck 72 to be substantially parallel to the floor when elbows 81 contact the floor.

Basket section 74 also forms an offset in body section 20 from the plane of deck 72, providing a cavity into which rim 14 of rim-mounted tire 12 may extend. This offset prevents contact by truck 10 with rim 14 and precludes scratching rim 14. Basket section 74 comprises a plurality of joints 86 coupled end-to-end at angles 84 between deck 72 and fork section 30. Plate 26 extends between one parallel set of joints 86 to define the separation between portions of bar 22 forming body 20. Preferably, grip 28 substantially matches in length the spacing effected by plate 26, causing the corresponding portions of bar 22 on opposite sides of longitudinal axis A of truck 10 to be parallel, though one having ordinary skill in the art will recognize that they need not be parallel.

As best seen in FIG. 2, this spacing between corresponding portions of bar 22 in body 20 is substantially less than the spacing between wheels 40 and feet 32 supporting tire 12. Such spacing permits an operator to stand on either side of body 20 behind axle 60 as shown in FIG. 2, thereby accommodating either left- or right-handed operators. Since the center of gravity of tire 12 should coincide with axis A, the closer the operator can stand to axis A the more easily he can manipulate truck 10 using grip 28. One having ordinary skill in the art will recognize that the proportions implied by FIG. 2 are not controlling, and all variations in the width and shape of body 20 are within the spirit and scope of the present invention.

Figure 4A:
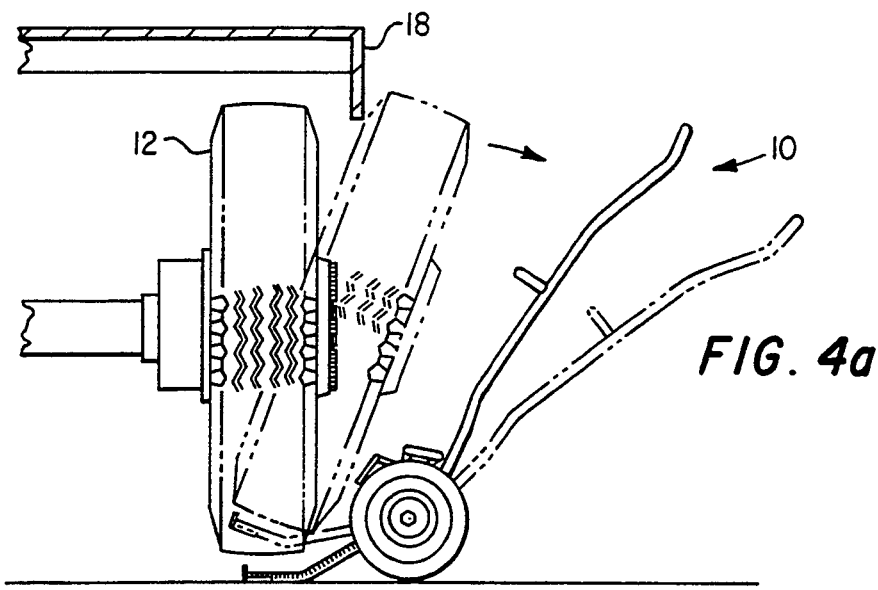
FIGS. 4a and 4b depict removal and installation respectively of a tire using the tire truck.

In operation, truck 10 may be used to remove tire 12 from vehicle 18 without necessity of reaching under the fender by the operator. As seen in FIG. 4a, the operator places feet 32 of fork section 30 beneath the tread of tire 12 and pushes down on grip 28. This lifts feet 32 to engage tire 12, and further lifting will cause truck 10 to bear the weight of tire 12. The operator may then place a foot onto step 44 and push truck 10 slightly toward vehicle 18, causing tire 12 to tilt toward truck 10. The operator then pulls truck 10 away from vehicle 18, carrying tire 12 with it until lugs 17 clear lug holes 15 on rim 14. At this point, vehicle 18 no longer supports tire 12, and it may fall against tire rests 42 and prop 24.

Figure 4B:
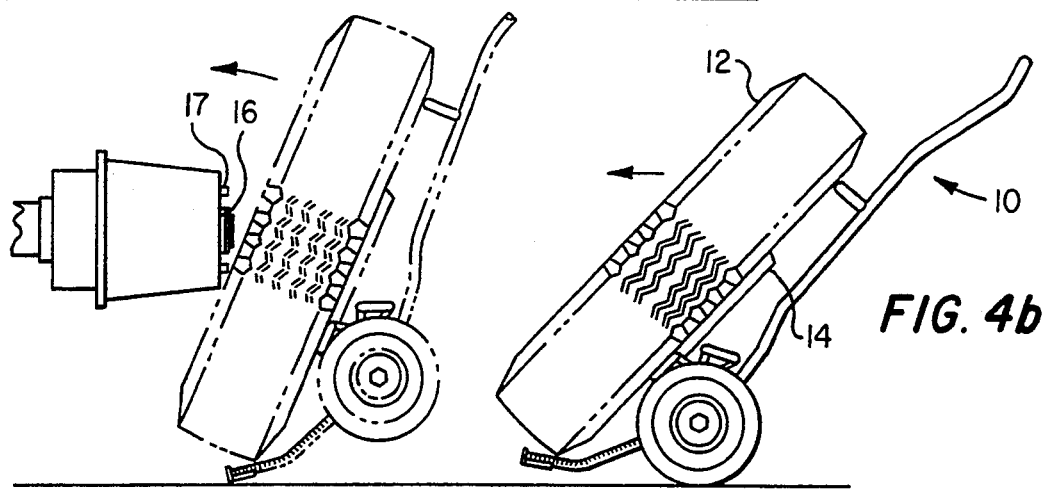

If the operator reaches under the fender of vehicle 18 to the top of tire 12 during this operation, he can steady tire 12 and better control its release from vehicle 18, but experiments have shown that this is not required. Once tire 12 begins to fall toward truck 10, the operator can lift grip 28 to engage pads 34 with the floor and bring prop 24 closer to tire 12, as shown in FIG. 4b. This technique better controls the descent of tire 12 than permitting it to fall while wheels 40 remain in contact with the floor. Experiments have shown, however, that this also in not necessary because of stability resulting from the separation of tines 31.

As seen at the right in FIG. 4b, truck 10 supports tire 12 for transportation. In fact, truck 10 will support tire 12 without the operator holding grip 28, because the center of gravity of tire 12 rests forward of wheels 40 and axle 60. Thus, the operator may move the loaded truck 10 aside and park it until tire 12 is needed later. Tire 12 will not roll off of truck 10 because a portion of tire 12 extends below feet 32, which straddle the center of gravity of tire 12.

Tire 12 may be dumped off of truck 10 by lifting grip 28, as shown at the left of FIG. 4b, until tire 12 falls away from truck 10 onto the floor. Truck 10 may also be used to lift a prone tire 12 from the floor (not shown). The operator shoves feet as far under the sidewall of tire 12 as he can and then depresses grip 28 until elbows 81 contact the floor, using his foot once it becomes convenient to do so as handle 70 nears the floor. While holding tire 12 with his knee, the operator then repeatedly rolls truck 10 farther under tire 12 to reset it and depresses grip 28 again for further lifting. Once he can engage feet 32 with the tread of tire 12 adjacent the floor, he can let tire 12 rest against tire rest 42 and prop 24 and move tire 12 about using truck 10.

Installation proceeds largely in reverse of removal. The operator maneuvers tire 12 into position with truck 10 and then lifts grip 28 to bring pads 34 into contact with the floor and wheels 40 off the floor. This encourages the top of tire 12 into a substantially vertical position immediately in front of the vehicle hub 16 and lugs 17. It should be noted that tire 12 is not just dumped against hub 16, causing impact with lugs 17 by rim 14. Instead, motion demonstrated at the left in FIG. 4b serves simply to stand tire 12 upon its tread directly in front of hub 16. The operator then depresses grip 28 to lift tire 12 vertically and rolls truck 10 toward hub 16 to set tire 12 onto hub 16, reaching under the fender to steady the top of it if necessary. Once its weight is supported by hub 16, tire 12 may be spun until lug holes 15 match lugs 17. Grip 28 again is depressed slightly to lift tire 12 onto lugs 17 and translate rim 14 into position supported by lugs 17. Nuts (not shown) may then be installed to hold rim 14 to vehicle 18.

Figure 5:
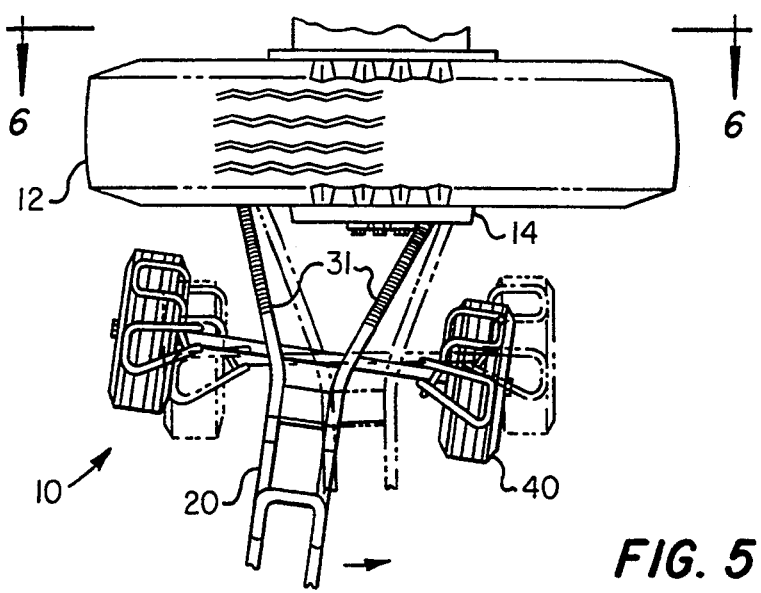
FIG. 5 shows in plan view the rotational manipulation of the tire to align lug holes in the rim with lugs on the vehicle hub.

FIGS. 5 and 6 demonstrate a method by which truck 10 may be used to align lug holes 15 with lugs 17. Once hub 16 supports tire 12, feet 32 are placed under and in contact with the tread of tire 12 but not lifting enough to support it. The operator then horizontally translates grip 28 to pivot truck 10 about its own center of gravity at axle 60, causing feet 32 to translate in the opposite direction. This in turn causes tire 12 to rotate, as shown in FIG. 6. With practice, an operator can learn to spin a tire just enough to align lugs 17 and lug holes 15 with very little effort and without having to reach far under the fender of vehicle 18.

While the invention has been particularly shown and described with reference to a preferred embodiment, it will be understood by those skilled in the art that various changes in form and detail may be made therein without departing from the spirit and scope of the invention. For example, FIG. 2 implies an overall size of truck 10 relative to an adult human, but substantial variations both larger and smaller may be appropriate for larger or smaller tires, though truck 10 as depicted in FIG. 2 can serve for tires substantially smaller or larger than tire 12 shown in FIG. 3. As another example, truck 10 could be adapted for use as a hand dolly for other transporting and lifting duties, either for general use or for other specialty applications. If outfitted with an angled plate (not shown) or other device spanning the separation between feet 32, truck 10 could carry or lift objects much smaller or narrower than tires, as well as objects wider than the separation of wheels 40. Used thusly for transporting heavy appliances, truck 10 offers the advantage of a lowered center of gravity and balance thereof over axle 60 in contrast to conventional upright dollies.

I claim:

1. A tire truck for mounting, unmounting and transporting a tire, the tire truck comprising:
    an elongated body having a longitudinal axis divided by a flat plate, the body further having
        two bars coupled to opposite sides of the plate and extending parallel to the longitudinal axis to form a handle having a proximate end forming a plant adjacent the plate and a distal end having a transverse grip connecting the bars; and
        a fork coupled to the handle adjacent the plate and extending opposite the handle, the fork further having two divergent, segmented tines terminating in feet bearing pads, the segments of the tines being arranged at angles to each other to offset the feet from the plane;

axle means transverse the fork between the plate and the pads and having;
  a single axle coupled to each tine;
  a wheel on each end of the axle; and
  a step coupled to the axle and covering a portion of a tread of each wheel, said step being accessible by a user from rearward the truck; and
tire rest means for resting a tire supported by the feet against the body.

2. The tire truck according to claim 1 wherein the body is formed by two bars coupled at one end by the grip and spaced apart between the handle and the fork by the plate, each of the fork tines coupled to and extending from one of the bars adjacent the plate.

3. The tire truck according to claim 1 wherein the tire rest means comprises
  a prop coupled to the body and extending perpendicular thereto, the prop forming a bearing surface offset from the body and adapted to engage a portion of the tire; and
  two fenders, each fender coupled to the fork and spanning one of the wheels on each end of the axle for engaging another portion of the tire resting upon the tines and leaning against the prop.

4. The tire truck according to claim 3 wherein the prop further comprises
  a hollow shank coupled to the prop, the shank adapted to be received within a tubular collar attached to the body; and
  a spring pin carried within the shank and adapted to cooperate with pin ports arranged along the longitudinal length of the collar for adjustably securing the shank to the collar for adjusting a position of the prop along the longitudinal axis.

5. A tire truck having a front, a rear and a longitudinal axis, the tire truck further comprising:
  a body having
    a rectangular flat plate further having a transverse width bifurcated by the longitudinal axis; and
    two bars coupled to and extending from opposite sides of the plate, parallel to each other and equidistant from the longitudinal axis, to form a handle section terminating in a transverse grip connecting the bars, the bars further extending from the plate opposite the handle section, diverging and curving rearwardly to form a fork section;
  an axle coupled to the fork section and extending perpendicular to the longitudinal axis, the axle terminating in axle ends spaced at a substantially greater transverse width than the width of the plate, the axle ends bearing wheels having rims;
  step means coupled to the fork section for providing a place for a user of the tire truck to place a foot to help manipulate and control the tire truck;
  two divergent tines curving forwardly from the fork section to terminate in pads, the tines adapted to support a tread of a tire; and
  tire rest means for resting a tire against the truck.

6. The tire truck according to claim 5 wherein the step means comprises
  two steps coupled to opposite axle ends and spanning the trim of the wheel disposed on the respective axle end, each step forming a plane substantially parallel the rim and disposed radially about the axle substantially adjacent the plate for providing access to the step by a user from alongside the body rearward the axle.

7. The tire truck according to claim 5 wherein the handle section further comprises
  a lower deck portion adjacent the plate and forming a first plane substantially parallel to and offset forward of the axle; and
  an upper portion having
    a first segment coupled to the deck portion and extending at an angle rearwardly therefrom to terminate in elbows offset rearwardly from the first plane; and
    a second segment coupled to the first segment at the elbows and extending to the grip and offset frontwardly from the elbows.

8. The tire truck according to claim 7 wherein the tire rest means comprises
  the lower deck portion;
  two fenders coupled to the axle, each arranged to cover a portion of the tread of one of the wheels, the fenders forming a second plane substantially parallel the first plane; and
  traction means on the tines adjacent the pads for providing traction to the tread of the tire borne by the tire truck.

9. The tire truck according to claim 8 wherein the lower deck portion further comprises
  a prop coupled to the bars and extending forwardly therefrom normal to the first plane, the prop having a substantially rectangular profile with one edge thereof forming a bearing surface offset from the deck portion and adapted to engage the tire resting on the tines.

10. The tire truck according to claim 9 wherein the prop further comprises adjustment means for adjusting a position of the prop along the longitudinal axis.

11. The tire truck according to claim 10 wherein the adjustment means further comprises
  a deck plate coupled between the bars
  a tubular collar attached to the deck plate parallel the longitudinal axis;
  a hollow shank adapted to be received within the collar; and
  spring pin means carried within the shank and adapted to cooperate with pin ports arranged along the longitudinal length of the collar for adjustably securing the shank to the collar.

12. The tire truck according to claim 8 wherein the traction means comprises
  a plurality of transverse grooves inscribed into the tines.

13. The tire truck according to claim 8 wherein the step means comprises
  two steps coupled to opposite axle ends and spanning the rim of the wheel disposed on the respective axle end, each step forming a plane substantially parallel the axle and disposed radially about the axle substantially adjacent the plate for providing access to the step by a user from rearward the axle alongside the body.

14. The tire truck according to claim 6 wherein the handle section further comprises
  a lower portion adjacent the plate and offset frontward the axle, the lower portion having a proximate end adjacent the plate and a distal end; and
  an upper portion having
    a first segment coupled to the distal end and extending at an angle rearwardly therefrom to elbows; and
    a second segment coupled to the elbows and extending forwardly to terminate at the grip.

* * * * *